United States Patent
Stephenson et al.

(10) Patent No.: US 10,408,028 B2
(45) Date of Patent: Sep. 10, 2019

(54) OPTIMIZATION OF ENGINE EMISSIONS FROM EQUIPMENT USED IN WELL SITE OPERATIONS

(71) Applicant: Halliburton Energy Services, Inc., Houston, TX (US)

(72) Inventors: Stanley V. Stephenson, Duncan, OK (US); Andrew James Summers, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 418 days.

(21) Appl. No.: 15/022,186

(22) PCT Filed: Oct. 15, 2013

(86) PCT No.: PCT/US2013/065010
§ 371 (c)(1),
(2) Date: Mar. 15, 2016

(87) PCT Pub. No.: WO2015/057196
PCT Pub. Date: Apr. 23, 2015

(65) Prior Publication Data
US 2016/0222771 A1 Aug. 4, 2016

(51) Int. Cl.
*E21B 41/10* (2006.01)
*E21B 43/26* (2006.01)
(Continued)

(52) U.S. Cl.
CPC .............. *E21B 43/26* (2013.01); *E21B 41/00* (2013.01); *F02D 29/04* (2013.01); *G05B 15/02* (2013.01);
(Continued)

(58) Field of Classification Search
CPC .......... E21B 41/00; E21B 43/26; F01N 11/00; F02D 2250/36; F02D 2250/38; F02D 2400/00; F02D 29/04; G05B 15/02
See application file for complete search history.

(56) References Cited

U.S. PATENT DOCUMENTS

| | | | | |
|---|---|---|---|---|
| 4,368,705 A | * | 1/1983 | Stevenson | F02D 41/2422 123/357 |
| 5,431,042 A | * | 7/1995 | Lambert | G01M 15/102 73/114.71 |

(Continued)

FOREIGN PATENT DOCUMENTS

EP 1134371 A1 9/2001

OTHER PUBLICATIONS

Marine Notes, Horsepower and Brake Horsepower, Sep. 2012, p. 1/4.*

(Continued)

*Primary Examiner* — Abdelmoniem I Elamin
(74) *Attorney, Agent, or Firm* — John Wustenberg; Baker Botts L.L.P.

(57) ABSTRACT

Systems and methods for monitoring, calculating, and/or optimizing engine emissions produced in operating motorized equipment in well site operations or other jobs are provided. In one embodiment, the methods comprise: providing a set of exhaust emissions rates for one or more engines at a job site as a function of a speed of each engine and total brake horsepower to be provided by each engine; identifying one or more operating speeds or transmission gears for the one or more engines during an operation at the job site based at least in part on the set of exhaust emissions rates for the one or more engines; and operating the one or more engines at the one or more operating speeds or transmission gears during an operation at the job site.

17 Claims, 7 Drawing Sheets

(51) Int. Cl.
  *F02D 29/04* (2006.01)
  *E21B 41/00* (2006.01)
  *G05B 15/02* (2006.01)
  *F01N 11/00* (2006.01)

(52) U.S. Cl.
  CPC .......... *F01N 11/00* (2013.01); *F02D 2250/36* (2013.01); *F02D 2250/38* (2013.01); *F02D 2400/00* (2013.01)

(56) References Cited

U.S. PATENT DOCUMENTS

| | | | |
|---|---|---|---|
| 5,539,638 A | 7/1996 | Keeler et al. | |
| 5,703,777 A | 12/1997 | Buchhop et al. | |
| 5,983,628 A * | 11/1999 | Borroni-Bird | F01N 3/05 60/274 |
| 6,023,656 A * | 2/2000 | Cacas | E21B 49/00 702/12 |
| 6,231,817 B1 * | 5/2001 | Shimoda | B01D 53/945 422/177 |
| 6,662,795 B2 | 12/2003 | Baldwin et al. | |
| 6,939,824 B2 * | 9/2005 | Shimoda | B01D 53/945 502/327 |
| 7,676,318 B2 * | 3/2010 | Allain | F02D 41/021 701/103 |
| 8,495,908 B2 * | 7/2013 | Nagy | G01M 15/02 73/114.13 |
| 9,624,857 B2 * | 4/2017 | Sujan | F02D 41/029 |
| 2001/0028867 A1 * | 10/2001 | Shimoda | B01D 53/945 422/177 |
| 2002/0013653 A1 * | 1/2002 | Ohyama | F01L 13/0036 701/103 |
| 2006/0021326 A1 * | 2/2006 | Midlam-Mohler | B60K 6/48 60/278 |
| 2008/0162006 A1 * | 7/2008 | Landes | F02D 41/022 701/54 |
| 2008/0215205 A1 * | 9/2008 | Kariya | F01N 11/002 701/31.4 |
| 2009/0069999 A1 | 3/2009 | Bos | |
| 2010/0094490 A1 * | 4/2010 | Alston | B63H 21/17 701/21 |
| 2010/0106343 A1 * | 4/2010 | Donnelly | B60L 11/123 700/295 |
| 2012/0085541 A1 | 4/2012 | Love et al. | |
| 2012/0166096 A1 | 6/2012 | Stephenson et al. | |
| 2012/0216509 A1 * | 8/2012 | Sujan | F02D 41/021 60/274 |
| 2013/0068002 A1 * | 3/2013 | Nagy | G01M 15/02 73/114.13 |
| 2016/0040615 A1 * | 2/2016 | Sujan | F02D 41/021 701/108 |

OTHER PUBLICATIONS

International Search Report and Written Opinion issued in related PCT Application No. PCT/US2013/065010 dated Jul. 17, 2014, 16 pages.

* cited by examiner

OPTIMIZATION OF ENGINE EMISSIONS FROM EQUIPMENT USED IN WELL SITE OPERATIONS

CROSS-REFERENCE TO RELATED APPLICATION

The present application is a U.S. National Stage Application of International Application No. PCT/US2013/065010 filed Oct. 15, 2013, which is incorporated herein by reference in its entirety for all purposes.

BACKGROUND

The present disclosure relates to systems and methods for monitoring, calculating, and/or optimizing engine emissions produced in operating motorized equipment (e.g., pumping equipment) in well site operations or other jobs.

The performance of subterranean operations at a well site entails various steps, each using a number of devices. Many subterranean operations entail pumping one or more treatment fluids into the subterranean formation. For example, drilling operations play an important role when developing oil, gas or water wells or when mining for minerals and the like. During the drilling operations, a drill bit passes through various layers of earth strata as it descends to a desired depth to drill a well bore. During the drilling process, a drilling fluid may be pumped through the drillstring into the well bore, among other reasons, to circulate drill cuttings out of the well bore to the surface and/or to cool the drill bit or other downhole equipment. In another example, hydraulic fracturing operations are often used to increase the production of desired fluids (e.g., hydrocarbons, water, etc.) from a formation of interest. In hydraulic fracturing operations, a fracturing fluid is pumped into a well bore that penetrates a subterranean formation at a sufficient hydraulic pressure to create or enhance one or more cracks, or "fractures," in the subterranean formation. The creation and/or enhancement of these fractures, among other things, may enhance the flow of fluids through the subterranean formation so that they may be produced out of the subterranean formation more readily. In another example, downhole cementing operations typically involve the mixing and pumping of large volumes of cement into a well bore, among other purposes, to prepare the well bore for the production of fluids.

In these and other well site operations, motorized pumps as well as other types of engine-driven motorized equipment (e.g., drilling motors, blenders, conveyers, and the like) may be used to perform a variety of tasks related to constructing, completing, and maintaining the well site and/or producing fluids from the well. For example, heavy duty pumps typically are used to transport treatment fluids such as drilling fluids and fracturing fluids from tanks, trucks, or pits at a well site into the well bore and to introduce them into the well bore at the rates and pressures needed to perform a particular treatment or operation. The operation of this equipment often requires large amounts of fuel (e.g., diesel, gasoline, natural gas, etc.), which may be costly to procure, transport, and maintain at a well site. Fuel-burning engines and other devices also may produce various types of emissions, such as nitrogen-based compounds (e.g., oxides such as nitrogen monoxide and nitrogen dioxide), carbon-based compounds (e.g., carbon monoxide, carbon dioxide, and non-methane hydrocarbons), sulfur-based compounds (e.g., oxides such as sulfur monoxide), excess oxygen concentration, particulate matter, or the like. In some cases, these substances may create undesirable health and/or safety risks, and the maximum amounts of such emissions permitted at a particular job site may be regulated and/or taxed by law in certain regions.

BRIEF DESCRIPTION OF THE FIGURES

These drawings illustrate certain aspects of some of the embodiments of the present disclosure, and should not be used to limit or define the disclosure.

Figure 1:
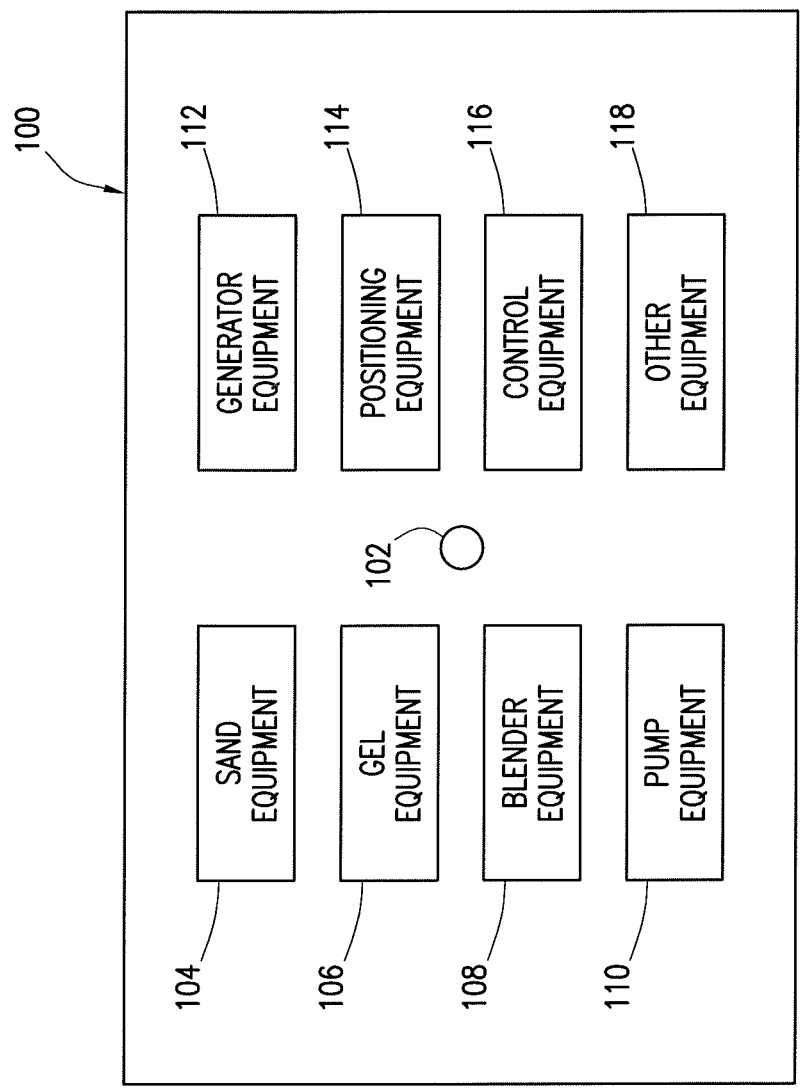
FIG. 1 is a diagram illustrating a job site with a well bore according to certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to systems and methods for monitoring, calculating, and/or optimizing engine emissions produced in operating motorized equipment (e.g., pumping equipment) in well site operations or other jobs.

More specifically, the present disclosure provides systems and methods for monitoring, calculating, and/or optimizing the amounts of emissions produced by one or more engines used to run various types of motorized equipment at a well site or other type of job site. Examples of such motorized equipment may include, but are not limited to, pumping units, blenders, mixers, agitators, conveyors, drilling motors, and the like. The methods and systems of the present disclosure may be used to calculate the expected amounts of different types of emissions produced by one or more engines at a well site operating at certain engine speeds. These calculations may be run prior to and/or at substantially the same time as one or more operations at the well site. In certain embodiments, this information may be used to select engine speeds that will minimize the rate and/or amounts of one or more exhaust emissions, and operate one or more engines at a job site at those speeds.

The methods and systems of the present disclosure may, among other benefits, allow operators to determine the speed at which to run one or more engines that will optimize (e.g., reduce) the amounts of one or more emissions produced by that equipment, for example, within a particular Tier rating. These calculations may be performed in or near real time at a well site, which may permit operators to adjust engine speed and/or other parameters to further refine and optimize the equipment's emissions. The methods and systems of the present disclosure also may permit operators to more accurately predict and control the amount of emissions that may be produced a particular operation, which may, among other benefits, reduce environmental, health, and/or safety risks associated with certain types of emissions. The methods and systems of the present disclosure also may permit operators complete a job as planned while maintaining compliance with various standards and/or regulations relating to emissions. The methods and systems of the present disclosure also may permit operators to more accurately predict and control the amount of emissions that may be produced a particular operation independent of fuel consumption rates, which may or may not correlate with emissions rates. Generally, these and other benefits of the methods and systems of the present disclosure may permit operators to conduct well site operations in a more efficient and/or cost-effective manner, and/or to more accurately predict the costs of such operations.

FIG. 1 illustrates a job site 100 in accordance with one aspect of the present disclosure. The job site 100 may comprise a well 102 or other suitable structure at which equipment is used to perform an operation. Other types of sites may include, for example, a construction site. The equipment includes one or more internal combustion or other suitable engines that consume fuel to perform work at the site 100. The well 102 may be a hydrocarbon or other well for producing oil, gas and/or other resources. In this embodiment, the operation may comprise, for example, a cementing operation, a fracturing operation, or other suitable operation where equipment is used to drill, complete, produce, enhance production, and/or work over the well 102. Other operations may include, for example, operating or construction of a facility.

Referring to FIG. 1, the job site 100, for the illustrated embodiment, includes sand equipment 104, gel equipment 106, blender equipment 108, pump equipment 110, generator equipment 112, positioning equipment 114, control equipment 116 and other equipment 118. The equipment may be, for example, truck or rig-mounted equipment. The sand equipment 104 may include transport trucks for hauling to and storing at the site 100 sand for use in the job. The gel equipment 106 may include transport trucks for hauling to and storing at the site 100 materials used to make a gel for use in the job. The blender equipment 108 may include blenders, or mixers for blending materials at the site for the job. The pump equipment 110 may include pump trucks for pumping materials down the well 102 for the job. The generator equipment 112 may include generator trucks for generating electric power at the site 100 for the job. The electric power may be used by sensors, control and other equipment. The positioning equipment 114 may include earth movers, cranes, rigs or other equipment to move, locate or position equipment or materials at the site 100 or in the well 102.

The control equipment 116 may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the control equipment 116 may be a personal computer, a network storage device, a network terminal, or any other suitable device and may vary in size, shape, performance, functionality, and price. The control equipment 116 may include an instrument truck coupled to some, all, or substantially all of the other equipment at the site 100 and/or to remote systems or equipment. The control equipment 116 may include one or more processing resources such as a central processing unit (CPU) or hardware or software control logic. The control equipment 116 may include a special purpose computer programmed to perform the functions described herein. Any suitable processing application software package may be used by the controller to process the data. Examples of special purpose computer systems programmed to perform these functions include, but are not limited to, those used in the SENTRY™ and INSITE™ services and systems provided by Halliburton Energy Services, Inc. The control equipment 116 may be connected by wireline or wirelessly to other equipment to receive data for or during the job. The data may be received in or near real-time or otherwise. In another embodiment, data from or for equipment may be keyed into the control equipment 116.

The control equipment 116 may be coupled to or include a memory that contains data and/or the programs to be executed as the control equipment 116 performs its functions as well as constants and variables used to perform those functions. The control equipment 116 may be coupled to or include one or more input/output devices 224, such as a keyboard, a mouse, a monitor or display, a speaker, a microphone, or an external communications interface. The control equipment 116 also may include one or more buses operable to transmit communications between the various hardware components. In certain embodiments, the control equipment 116 produces data that may be presented to the operation personnel in a variety of visual display presentations such as a display communicatively coupled to or included in control equipment 116. The data may be presented to the user in a graphical format (e.g., a chart) or in a textual format (e.g., a table of values). In other example systems, the display may show warnings or other information to the operator when the control equipment 116 detects a particular condition relating to emissions, such as the amount of exhaust emissions from a particular engine exceeding a preset amount.

The control equipment 116 may be located on one or more pieces of equipment at the site 100, on an instrument truck located at the site 100, or at a remote location. Each piece of equipment at site 100 may include its own control equipment 116, or multiple pieces of equipment at the site 100 may share common control equipment 116. In certain embodiments where certain pieces of equipment at the site 100 include or are coupled to their own control equipment 116 in accordance with the present disclosure, that equipment may be operated so as to minimize exhaust emissions on any individual unit, while other pieces of equipment may be run traditionally. In other embodiments, multiple pieces of equipment or all of the equipment at the site 100 may include or be coupled to control equipment 116 in accordance with the present disclosure, and may be operated so as to minimize certain types of exhaust emissions across the multiple pieces of equipment.

The control equipment 116 also may be communicatively coupled to a network, such as a local area network or the Internet, either directly or through one or more input/output devices (e.g., an external communications interface). In certain embodiments, such a network may permit the data from the control equipment 116 to be remotely accessible by any computer system communicatively coupled to the network via, for example, a satellite, a modem or wireless connections. As would be appreciated by those of ordinary skill in the art, with the benefit of this disclosure, a controller and/or computer system communicatively coupled to control equipment 116 also may collect data from multiple well sites and/or wells to perform quality checks across a plurality of wells. The control equipment 116 also may be communicatively coupled to, for example, a remote real time operating center whereby the remote real time operating center is able to send and/or receive data from the control equipment 116. In certain embodiments, the data may be pushed at or near real-time enabling real-time communication, monitoring, and reporting capability. This may, among other benefits, allow an operator to continuously monitor exhaust emissions at a job site, and allow the collected data to be used in a streamline workflow in a real-time manner by other systems and operators concurrently with acquisition.

The terms "couple" or "couples," as used herein are intended to mean either an indirect or a direct connection. Thus, if a first device couples to a second device, that connection may be through a direct connection, or through an indirect connection via other devices and connections. The term "communicatively coupled" as used herein is intended to mean coupling of components in a way to permit communication of information therebetween. Two components may be communicatively coupled through a wired or wireless communication network, including but not limited to Ethernet, LAN, fiber optics, radio, microwaves, satellite, and the like. Operation and use of such communication networks is well known to those of ordinary skill in the art and will, therefore, not be discussed in detail herein.

The other equipment 118 may comprise equipment also used by or at the job or ancillary to the job. For example, the other equipment 118 may comprise personal or other vehicles used to transport workers to the site 100 but not directly used at the site 100 for the job.

During a particular operation at the job site, various portions of the equipment shown may be operated to perform work to accomplish the objectives of the operation. For example, in a fracturing operation, one or more fracturing fluids may be prepared using, for example, gel equipment 106 and/or blender equipment 108 as well as other equipment, and be pumped into the well 102 using the pump equipment 110. The fracturing fluid may be pumped into the well 102 at a sufficient hydraulic pressure to create or enhance one or more cracks or fractures in the subterranean formation penetrated by the well.

During equipment operation, work is performed by engines which consume fuel and produce emissions into the atmosphere. The engines may be operated at idle, at full horsepower, or at other suitable loads. Examples of engines that may be suitable in the methods, operations, and systems of the present disclosure may include engines commercially available from suppliers such as Caterpillar (Peoria, Ill.), Cummins, Inc. (Columbus, Ind.), MTU (Freidrechshafen, Germany), and others. The consumption of fuel may produce various types of exhaust emissions, including but not limited to, nitrogen-based compounds (e.g., oxides such as nitrogen monoxide and nitrogen dioxide), carbon-based compounds (e.g., carbon monoxide, carbon dioxide, and non-methane hydrocarbons), sulfur-based compounds (e.g., oxides such as sulfur monoxide) particulate matter, and mixtures thereof.

One embodiment of a method of the present disclosure for calculating and minimizing certain types of emissions for a single engine will now be described using, as an example, a 3512C CAT® engine manufactured by Caterpillar, Inc.

First, the output rates for each emission of interest are plotted as a function of the brake horsepower provided by the engine for a number of different speeds. In certain embodiments, emissions rates and/or brake horsepower data for a particular type and/or model of engine may be available from data sheets or other documentation provided by the engine manufacturer. These data may relate to any type of exhaust emission from an engine, including but not limited to, nitrogen-based compounds (e.g., oxides such as nitrogen monoxide and nitrogen dioxide), carbon-based compounds (e.g., carbon monoxide, carbon dioxide, and non-methane hydrocarbons), sulfur-based compounds (e.g., oxides such as sulfur monoxide) particulate matter. Such data provided by an engine manufacturer may reflect, for example, the maximum emissions rates and/or the minimum brake horsepower provided by the engine, and thus the actual emissions rates and/or brake horsepower for a particular engine may vary somewhat from manufacturer-provided data. A person of skill in the art with the benefit of this disclosure will recognize circumstances under which such variances may occur (e.g., if the operating conditions or age or condition of a particular piece of equipment may impact its efficiency) and whether those variances are significant in the context of a particular application of the present disclosure. In other embodiments, emissions rates and/or brake horsepower may be measured directly or otherwise determined experimentally, and that data may be stored in an appropriate manner.

Figure 2:
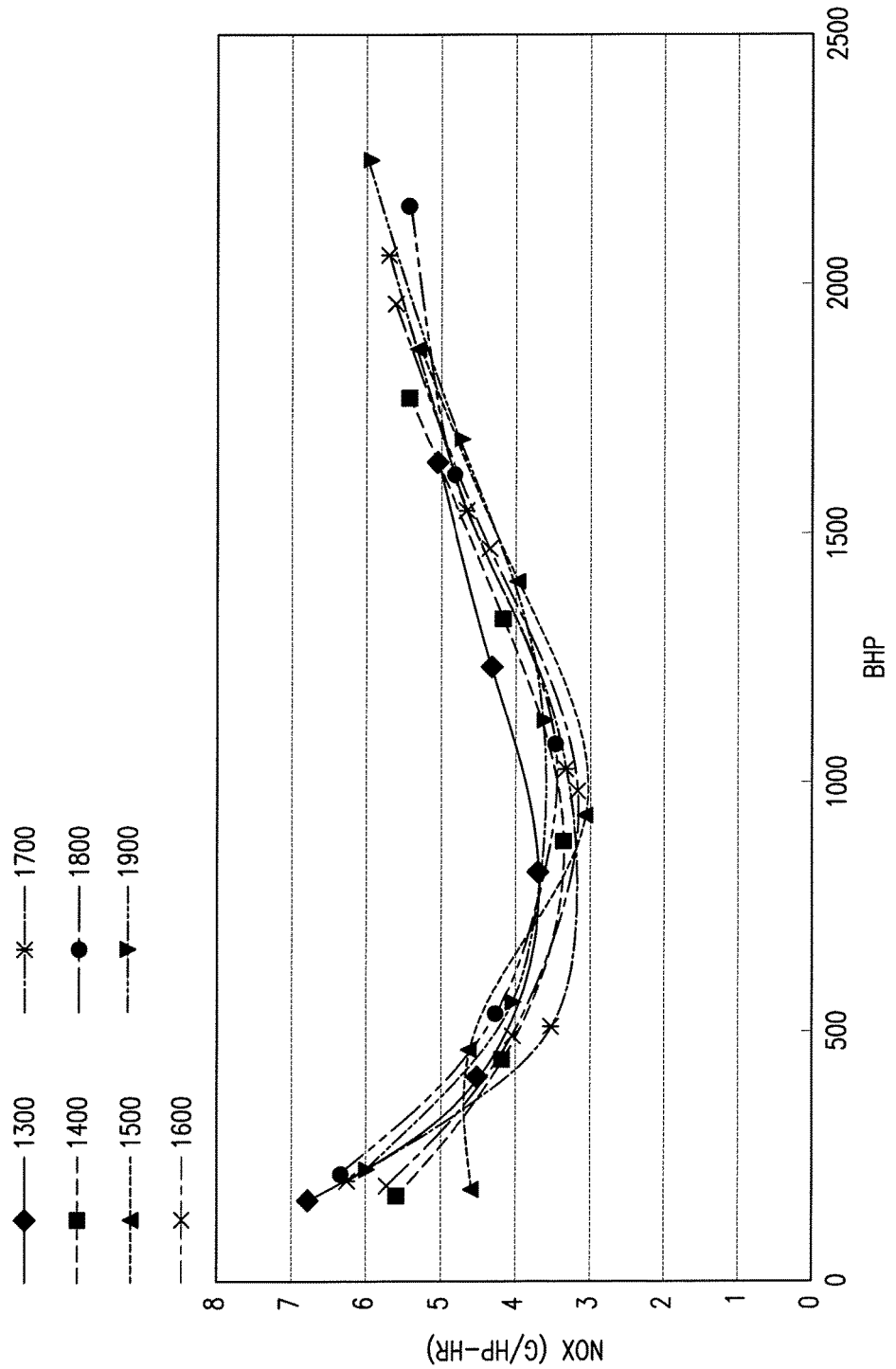
FIG. 2 is a graph illustrating data relating to nitrogen-based emission rates (nitrogen monoxide and nitrogen dioxide) of an engine according to one embodiment of the present disclosure.
Figure 3:
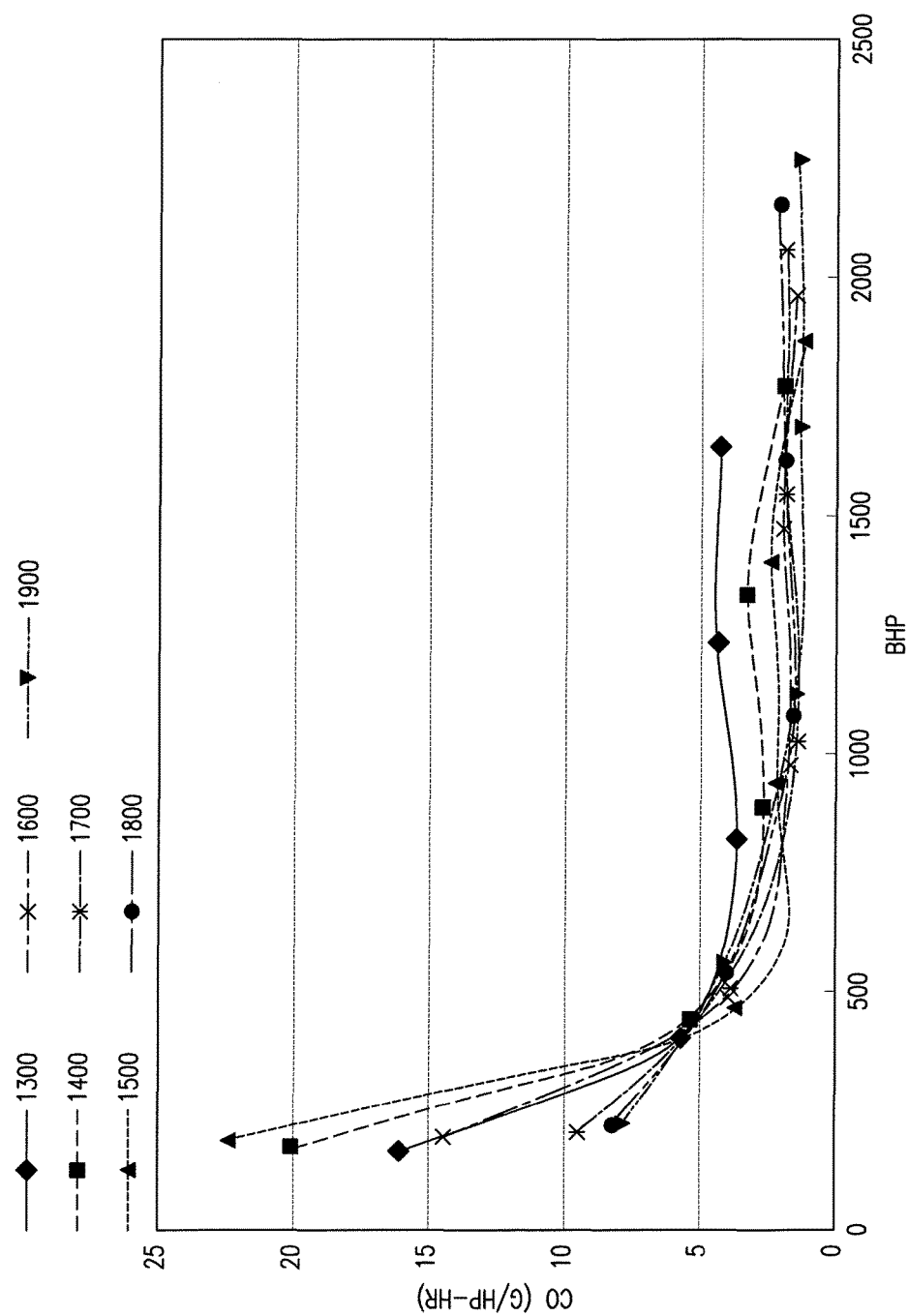
FIG. 3 is a graph illustrating data relating to carbon monoxide emission rates of an engine according to one embodiment of the present disclosure.
Figure 4:
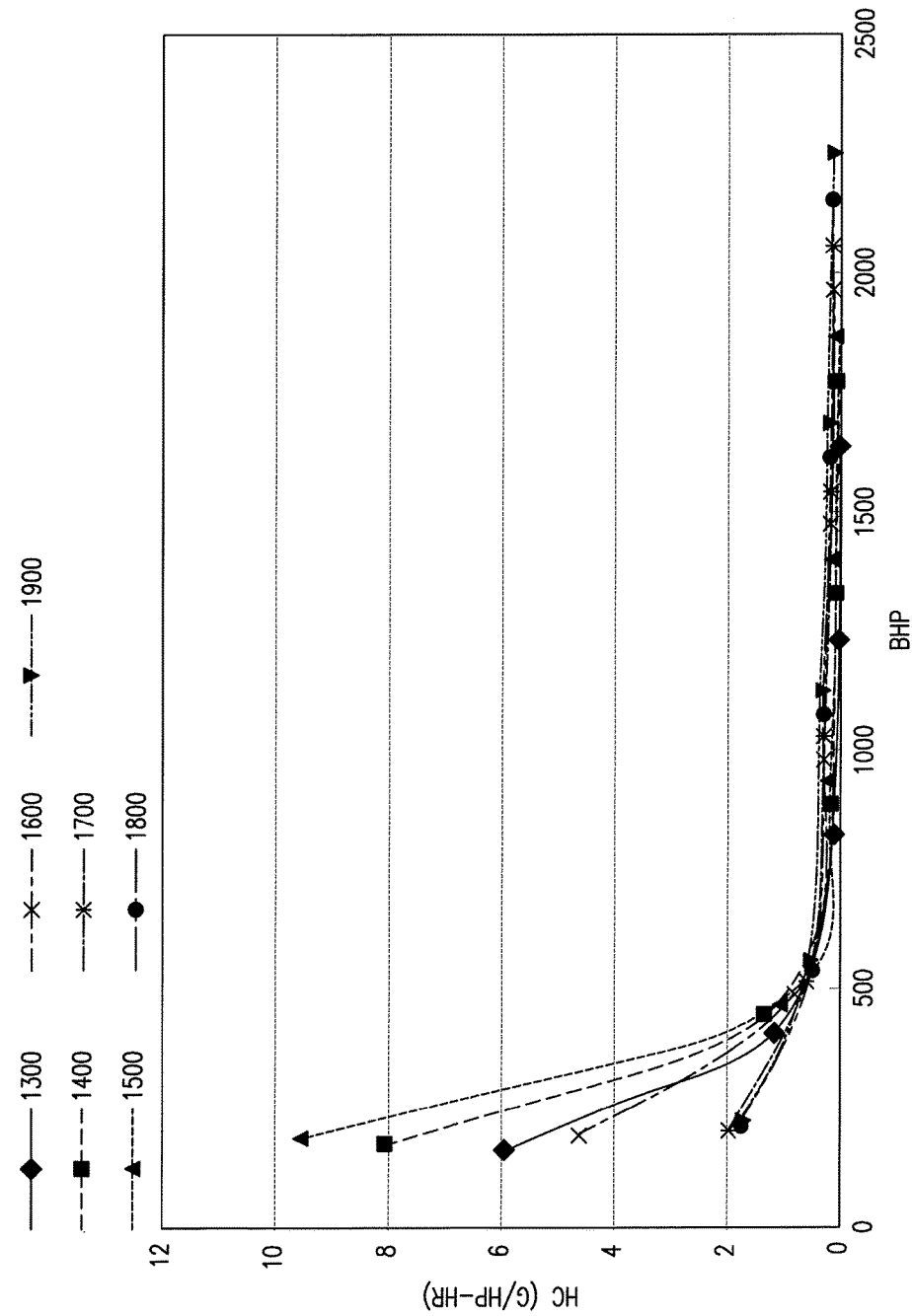
FIG. 4 is a graph illustrating data relating to non-methane hydrocarbon emission rates of an engine according to one embodiment of the present disclosure.
Figure 5:
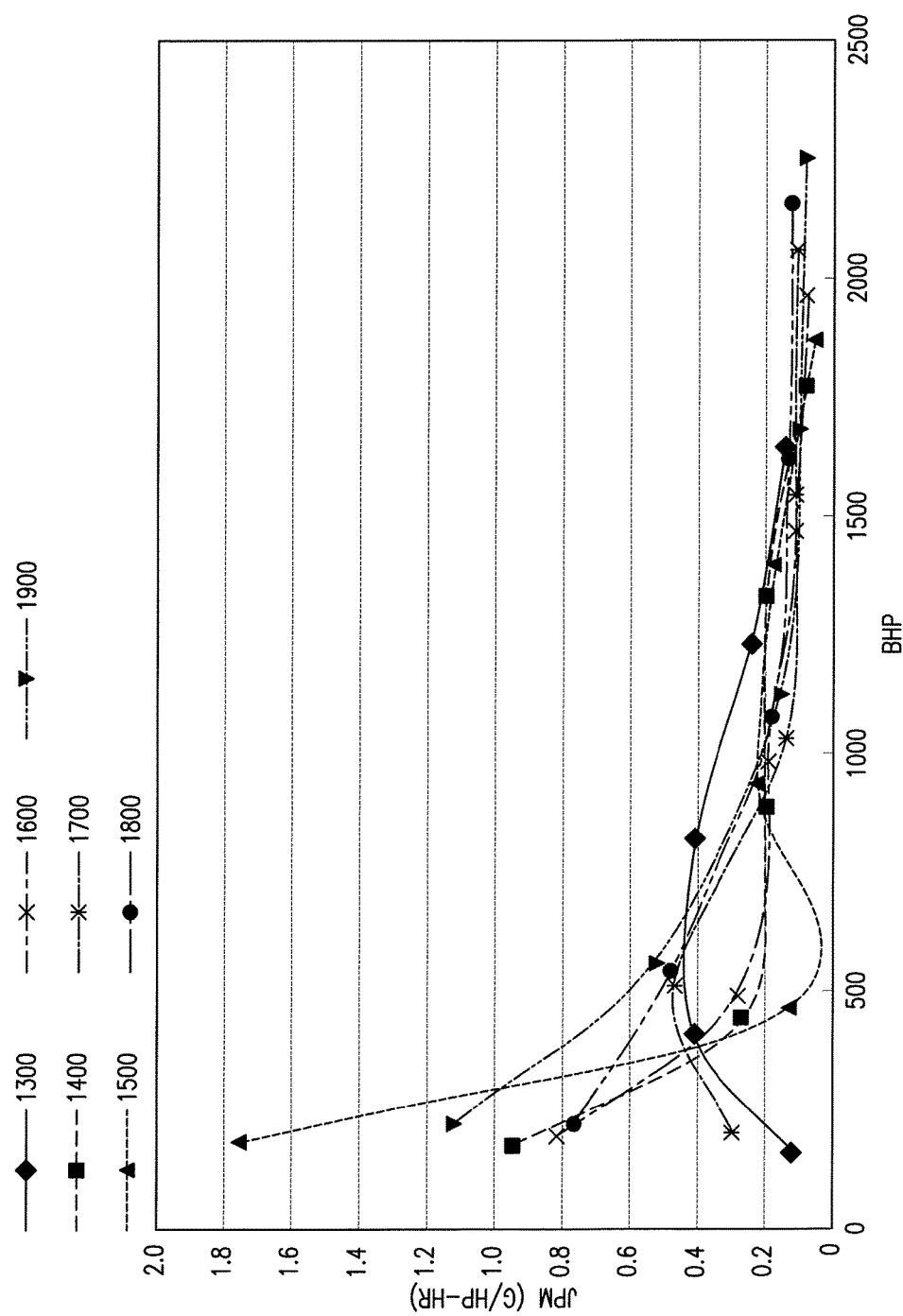
FIG. 5 is a graph illustrating data relating to particulate matter emissions of an engine according to one embodiment of the present disclosure.
Figure 6:
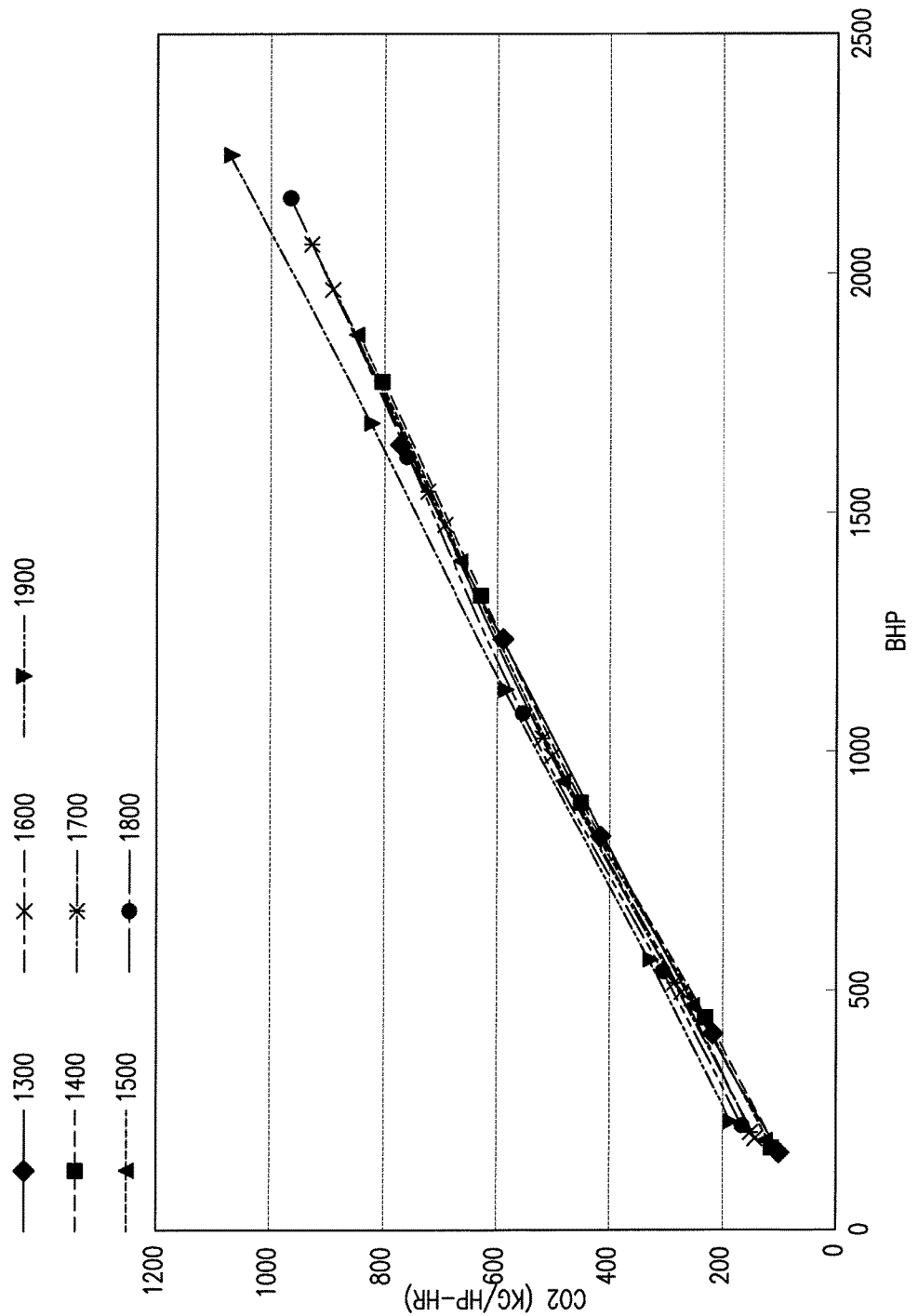
FIG. 6 is a graph illustrating data relating to carbon dioxide emissions of an engine according to one embodiment of the present disclosure.

FIGS. 2-6 are graphs illustrating the published emission rates for various types of emissions plotted as a function of total brake horsepower for the 3512C CAT® engine at engine speeds from 1300 rpm to 1900 rpm (100 rpm intervals). In certain embodiments, this type of information may be used to determine the gears and speeds at which to operate an engine so as to minimize one or more of these emission rates. As shown in FIG. 2, for the 3512C CAT® engine, nitrogen-based emissions reach their minimum rate at about 1000 bhp for all engine speeds. As shown in FIGS. 3 and 4, carbon monoxide and hydrocarbon emission rates generally approach their minimum rates at 500 bhp and remain flat at higher horsepowers for all engine speeds. As shown in FIG. 5, particulate matter emission rates also approach their minimum rates at 500 bhp and remain flat at higher horsepowers, although those rates are vary for different engine speed around the 500 bhp level. As shown in FIG. 6, carbon dioxide emission rates generally increase proportionally with brake horsepower at all engine speeds. In certain embodiments, this data may be curve-fit to produce equations for the emission rates as functions of engine speed and brake horsepower. For a job or well site operation requiring a particular brake horsepower from the engine, these equations can be solved for the engine speed value that produces the minimum emission rate.

The total brake horsepower load ($BHP_{total}$) needed from the engine to perform a particular job or operation includes both the desired hydraulic horsepower (HHP) to be provided by that engine for a particular job and the external parasitic load ($BHP_{ext}$). The desired hydraulic horsepower (HHP) for a particular job may be calculated according to Equation (1) below:

$$HHP = (\text{fluid pressure} \cdot \text{flow rate})/1714 \qquad (1)$$

wherein fluid pressure is expressed in pounds per square inch (psi) and the fluid flow rate is expressed in gallons per minute. The external parasitic load ($BHP_{ext}$) for an engine includes any power output by the engine that the unit does not use to generate hydraulic horsepower, which may include, for example, power that may be used to operate fans or other auxiliary components of the pumping unit. The external parasitic load ($BHP_{ext}$) for an engine may be calculated by any suitable means or method. For example, the external parasitic load ($BHP_{ext}$) may be calculated for a particular engine or group of engines by determining the total parasitic load for the engine and subtracting the internal parasitic load. In certain embodiments, the total parasitic load for an engine may be determined experimentally by running the engine at the possible speeds with its transmission in a neutral position and measuring the amount of fuel consumed per hour. The fuel consumption rates attributable to total parasitics can be converted to total parasitic loads by dividing that rate by the horsepower unit fuel consumption rate (i.e., gallons of fuel consumed per hour per unit brake horsepower) at the specified engine speed. In certain embodiments, the internal parasitic load may be determined by plotting fuel consumption rates as a function of brake horsepower using data published by the engine manufacturer. Such data may be curve-fit to provide a y-intercept value, which corresponds to the fuel consumption rate due to internal parasitics at zero brake horsepower. This internal parasitic fuel consumption rate can be converted to an internal parasitic load by dividing it by the horsepower unit fuel consumption rate at the specified engine speed. Examples of these calculations to determine total, internal, and external parasitic loads for an engine are described in further detail in the U.S. patent application entitled "Optimization of Fuel Consumption in Equipment Used in Well Site Operations" by Stephenson, et al., filed concurrently herewith.

Figure 7:
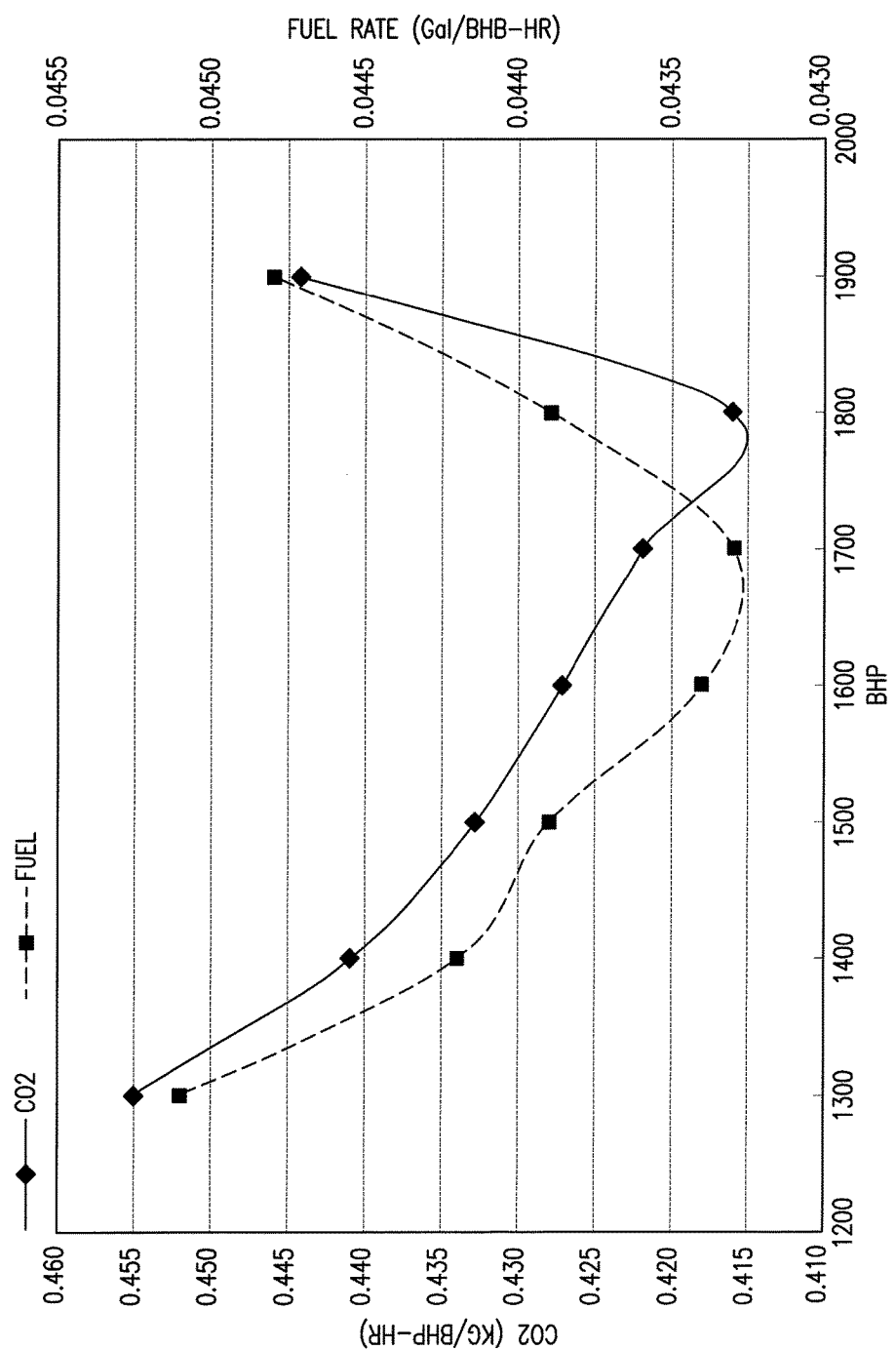
FIG. 7 is a graph illustrating data relating to carbon dioxide emission rates and fuel consumption rates of an engine according to one embodiment of the present disclosure.

In certain embodiments, the operating speed and/or transmission gears for a particular engine may be selected in a manner that minimizes emissions and/or emissions rates independent of or without reference to fuel consumption or fuel consumption rates. For example, FIG. 7 is a graph comparing fuel consumption rates and carbon dioxide emission rates for the 3512C CAT® engine (as published by the manufacturer) as a function of engine speed. As shown in this graph, the minimum carbon dioxide emission rate may be achieved at around 1800 rpm, whereas fuel consumption may be minimized at an engine speed of around 1700 rpm. Thus, by relying on data specific to emissions rates, the methods and systems of the present disclosure may permit operators to select engine speeds and/or transmission gears that more effectively minimize emissions and/or emissions rates as compared to techniques that rely on fuel consumption data.

The exhaust emissions equations can be used to calculate total exhaust emissions for any engine used at a job site, and/or to calculate the engine speeds and transmission gears of a particular pumping unit or other equipment that will produce the lowest amounts or rates of one or more types of emissions for an operation (e.g., a fracturing operation) requiring a particular amount of hydraulic horsepower. Such calculations may be made manually or by a computerized and/or automated device having the appropriate programming, data processing, and/or storage capabilities. These calculations may be performed at some point in time prior to the start of the operation in which the equipment is to be used (e.g., while a particular operation is being planned and/or discussed with a customer), and/or they may be performed as the operation is being performed. These calculations may be performed at the job site itself and/or at a remote location where data relating to the equipment at the job site is stored and/or received. In certain embodiments, a computer processor of the present disclosure may be further programmed to perform the calculations described above and/or to automatically select the engine speeds and/or transmission gears that will produce the lowest amounts or rates of one or more types of emissions. In certain embodiments, the exhaust emissions rates for a plurality of engines or different pieces of equipment at a particular job site may be analyzed in a similar manner to generate equations that can be used to identify combinations of engine speeds and transmission gears for each piece of equipment that may reduce or minimize emissions from all of the equipment.

In certain embodiments, one or more computer processors of the present disclosure may be programmed to generate a formula for total exhaust emissions and/or to perform some or all of the calculations described above. Such a computer processor may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. The computer processor also may be equipped with any software, programming, and/or executable instructions that, when executed, cause the processor to perform one or more of the actions, calculations, or steps of the methods of the present disclosure described herein. For example, the computer processor may be equipped with any software, programming, and/or executable instructions known in the art for performing curve fits on numeric data. In certain embodiments, the computer processor also may be provided with data relating to the expected emissions rates, engine loads, job parameters, predetermined emissions limits, and/or other data relating to the calculations described above and perform some or all of those calculations described above. In certain embodiments, the computer processor may be coupled to a memory device where data, software, programming, and/or executable instructions are stored. Such memory devices may comprise a hard drive, random access memory (RAM), read-only memory (ROM), or other similar storage media known in the art, and may include a set of instructions that when executed by the processor cause the processor to perform one or more of the actions, calculations, or steps of the methods of the present disclosure described herein.

In certain embodiments, the one or more computer processors may be located at the job site, such as control equipment 116 shown in FIG. 1. In other embodiments, the computer processor may be located at an offsite location (e.g., a remote real-time operating center). In certain embodiments, such computer processors whether onsite or offsite, may be programmed to control and/or adjust the operating speeds and/or transmission gears of certain engines or other motorized equipment at the job site based at least in part on the data relating to expected emissions rates, engine loads, job parameters, predetermined emissions limits, and/or the calculations described above. In certain embodiments, these components may be programmed to control and/or adjust the operating speeds and/or transmission gears of certain engines or other motorized equipment at the job site so as to meet a target level of one or more types of emissions. This target may include, for example, a total amount of emissions for one or more pieces of equipment, a maximum or average amount of emissions for one or more pieces of equipment per unit of time (e.g., per day), or any combination thereof.

The systems and methods of the present disclosure may be used to monitor, calculate, optimize, and/or control emissions rates in conjunction with any subterranean operation. For example, as discussed above, the systems and methods of the present disclosure may be used in fracturing operations, drilling operations, and/or cementing operations. However, the systems and methods of the present disclosure may be used in one or more other types of operations at a job site, including but not limited to stimulation operations (e.g., acidizing), completion operations, remedial operations, and the like. A person of skill in the art, with the benefit of this disclosure, will recognize how to apply or implement the systems and methods of the present disclosure as disclosed herein in a particular operation.

An embodiment of the present disclosure is a method comprising: providing a set of exhaust emissions rates for one or more engines at a job site as a function of a speed of each engine and total brake horsepower to be provided by each engine; identifying one or more operating speeds or transmission gears for the one or more engines during an operation at the job site based at least in part on the set of exhaust emissions rates for the one or more engines; and operating the one or more engines at the one or more operating speeds or transmission gears during an operation at the job site.

Another embodiment of the present disclosure is a control system comprising: at least one data processor; a memory comprising data for a set of exhaust emissions rates for one or more engines at a job site as a function of a speed of each engine and total brake horsepower to be provided by each engine; and a memory comprising executable instructions that, when executed, cause the at least one data processor to identify one or more operating speeds or transmission gears for the one or more engines during an operation at the job site based at least in part on the set of exhaust emissions rates for the one or more engines, and operate the one or more engines at the one or more operating speeds or transmission gears during an operation at the job site.

Another embodiment of the present disclosure is a method comprising: plotting and curve-fitting a set of exhaust emissions rates for one or more engines at a job site as a function of total brake horsepower load and engine speed to generate a formula for the exhaust emissions of the engine; using the formula for the exhaust emissions of an engine to identify one or more operating speeds or transmission gears for the one or more engines during an operation at the job site; and operating the one or more engines at the one or more operating speeds or transmission gears during an operation at the job site.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. The terms in the claims have their plain, ordinary meaning unless otherwise explicitly and clearly defined by the patentee.

What is claimed is:

1. A method comprising:
providing a set of exhaust emissions rates for one or more engines at a hydrocarbon well site as a function of a speed of each engine and total brake horsepower to be provided by each engine, wherein the total brake horsepower is based on an external parasitic load for the engine and an internal parasitic load for the engine, wherein the external parasitic load includes power output by the one or more engines that is not used to generate hydraulic horsepower;
identifying one or more operating speeds or transmission gears for the one or more engines during an operation at the job site based at least in part on the set of exhaust emissions rates for the one or more engines without reference to any of a fuel consumption and a fuel consumption rate of any of the one or more engines; and
reducing exhaust emissions of the one or more engines by operating the one or more engines at the one or more operating speeds or transmission gears during an operation at the job site.

2. The method of claim 1 wherein at least one of the set of exhaust emission rates comprises nitrogen dioxide emission rates, nitrogen monoxide emission rates, carbon monoxide emission rates, carbon dioxide emission rates, hydrocarbon emission rates, particulate matter emission rates, and any combination thereof.

3. The method of claim 1 further comprising the step of determining the external parasitic load for the one or more engines.

4. The method of claim 1 wherein the job site comprises a well site wherein a well bore has been drilled to penetrate at least a portion of a subterranean formation.

5. The method of claim 4 wherein the operation comprises at least a portion of a subterranean fracturing operation.

6. The method of claim 1 wherein identifying one or more operating speeds for the one or more engines comprises identifying the speed at which one or more of the exhaust emission rates is the lowest for a predetermined total brake horsepower.

7. The method of claim 1 wherein the one or more operating speeds for the one or more engines are identified independent of fuel consumption rates.

8. The method of claim 6 further comprising adjusting the operating speeds or transmission gears of the one or more engines during the operation at the job site based at least in part the operating speeds for the one more engines identified substantially in or near real time with the operation.

9. The method of claim 7 wherein a computer processor automatically adjusts the operating speeds or transmission gears of the one or more engines during the operation at the job site based at least in part the operating speeds for the one more engines identified substantially in or near real time with the operation.

10. The method of claim 1 wherein at least a portion of the steps of calculating a set of exhaust emissions rates for one or more engines at a job site and identifying one or more operating speeds or transmission gears for the one or more engines during an operation at the job site is performed at a location remote from the job site.

11. The method of claim 1 wherein the one or more engines comprise a plurality of engines at a job site.

12. The method of claim 11 wherein identifying one or more operating speeds or transmission gears for the plurality of engines comprises identifying the combination of speeds at which the sum of the exhaust emission rates for the plurality of engines is the lowest for a preselected set of brake horsepower loads for the plurality of engines.

13. A control system comprising:
   at least one data processor;
   a memory comprising data for a set of exhaust emissions rates for one or more engines at a hydrocarbon well site as a function of a speed of each engine and total brake horsepower to be provided by each engine, wherein the total brake horsepower is based on an external parasitic load for the engine and an internal parasitic load for the engine, wherein the external parasitic load includes power output by the one or more engines that is not used to generate hydraulic horsepower; and
   a memory comprising executable instructions that, when executed, cause the at least one data processor to
      identify one or more operating speeds or transmission gears for the one or more engines during an operation at the job site based at least in part on the set of exhaust emissions rates for the one or more engines without reference to any of a fuel consumption and a fuel consumption rate of any of the one or more engines, and
      reduce exhaust emissions of the one or more engines by operating the one or more engines at the one or more operating speeds or transmission gears during an operation at the job site.

14. The control system of claim 13 wherein the executable instructions, when executed, further cause the at least one data processor to adjust the operating speeds or transmission gears of the one or more engines during the operation at the job site based at least in part the operating speeds for the one more engines identified substantially in or near real time with the operation.

15. The control system of claim 13 further comprising an external communications interface communicatively coupled to the data processor, wherein the external communications interface is communicatively coupled to a network and permits data from the control system to be remotely accessed by a computer system communicatively coupled to the network.

16. A method comprising:
   plotting and curve-fitting a set of exhaust emissions rates for one or more engines at a hydrocarbon well site as a function of total brake horsepower load and engine speed to generate a formula for the exhaust emissions of the engine, wherein the total brake horsepower is based on an external parasitic load for the one or more engines and an internal parasitic load for the one or more engines, wherein the external parasitic load includes power output by the one or more engines that is not used to generate hydraulic horsepower;
   using the formula for the exhaust emissions of an engine to identify one or more operating speeds or transmission gears for the one or more engines during an operation at the job site without reference to any of a fuel consumption and a fuel consumption rate of any of the one or more engines; and
   reducing exhaust emissions of the one or more engines by operating the one or more engines at the one or more operating speeds or transmission gears during an operation at the job site.

17. The method of claim 16 further comprising the step of determining the external parasitic load for the one or more engines.

* * * * *